Sept. 14, 1954

C. L. SINGLETON 2,689,338

ELECTRICAL CHECKING DEVICE

Filed Feb. 13, 1952

INVENTOR.
Charles L. Singleton
BY
Fishburn Mullendore
ATTORNEYS.

Sept. 14, 1954  C. L. SINGLETON  2,689,338
ELECTRICAL CHECKING DEVICE
Filed Feb. 13, 1952  4 Sheets-Sheet 2
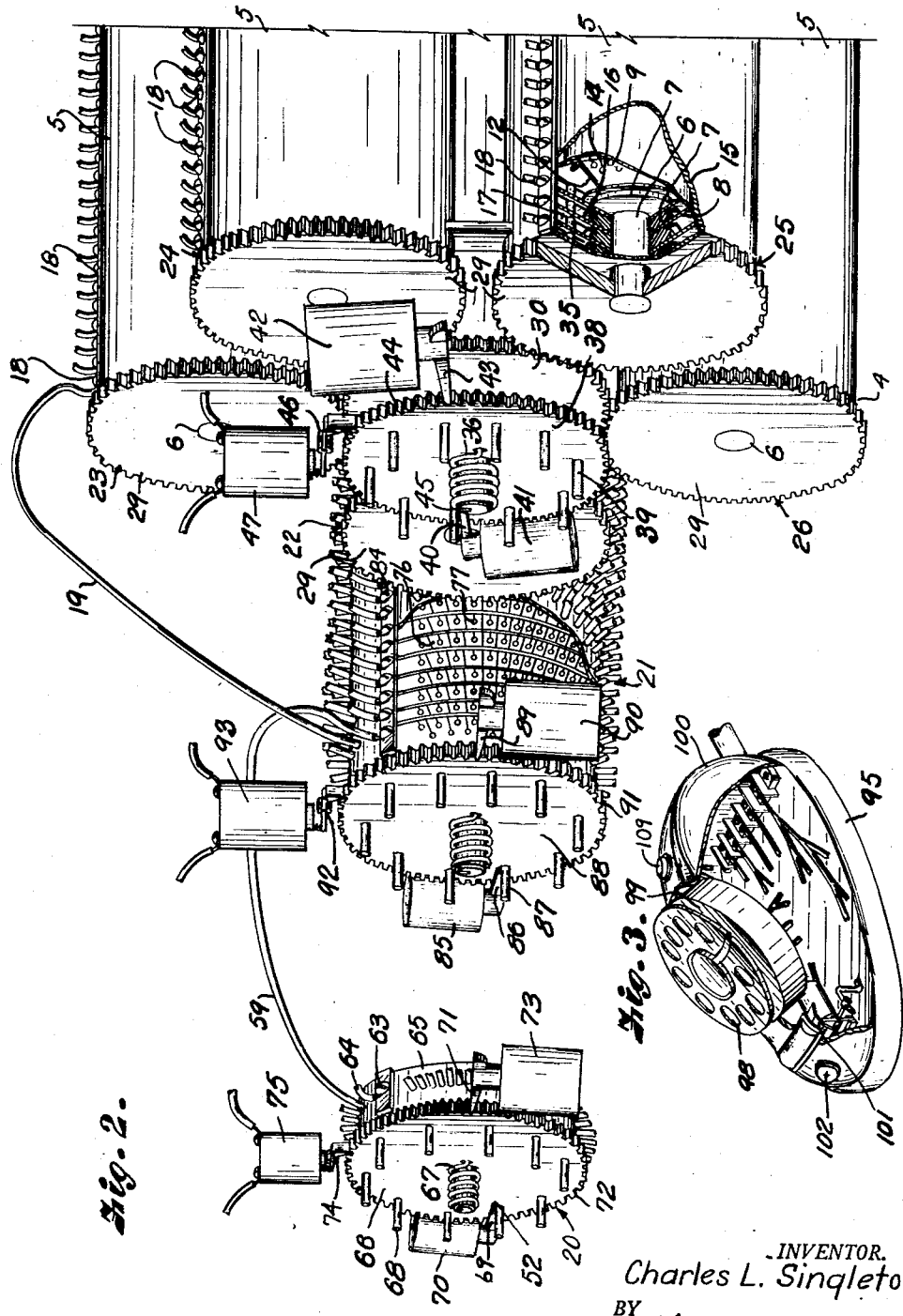
INVENTOR.
Charles L. Singleton.
BY
*Fishburn & Mullendore*
ATTORNEYS.

Sept. 14, 1954  C. L. SINGLETON  2,689,338
ELECTRICAL CHECKING DEVICE
Filed Feb. 13, 1952  4 Sheets-Sheet 3
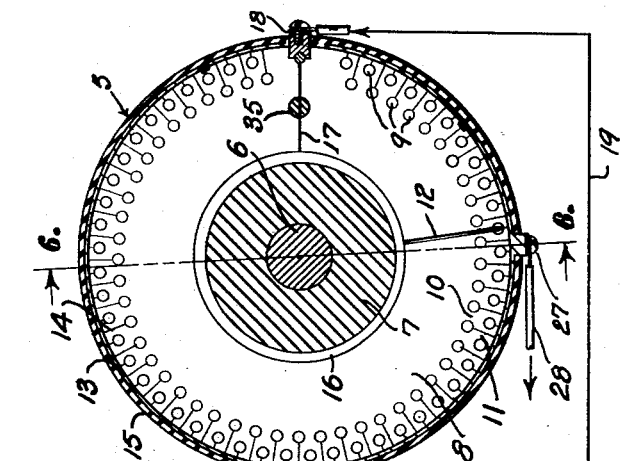
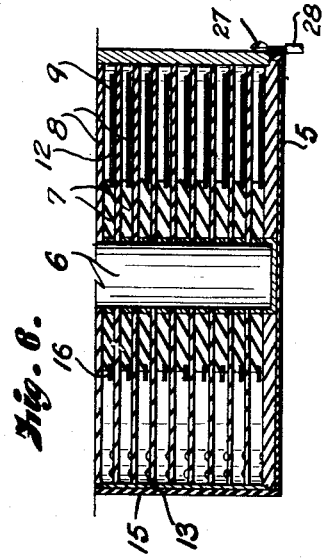
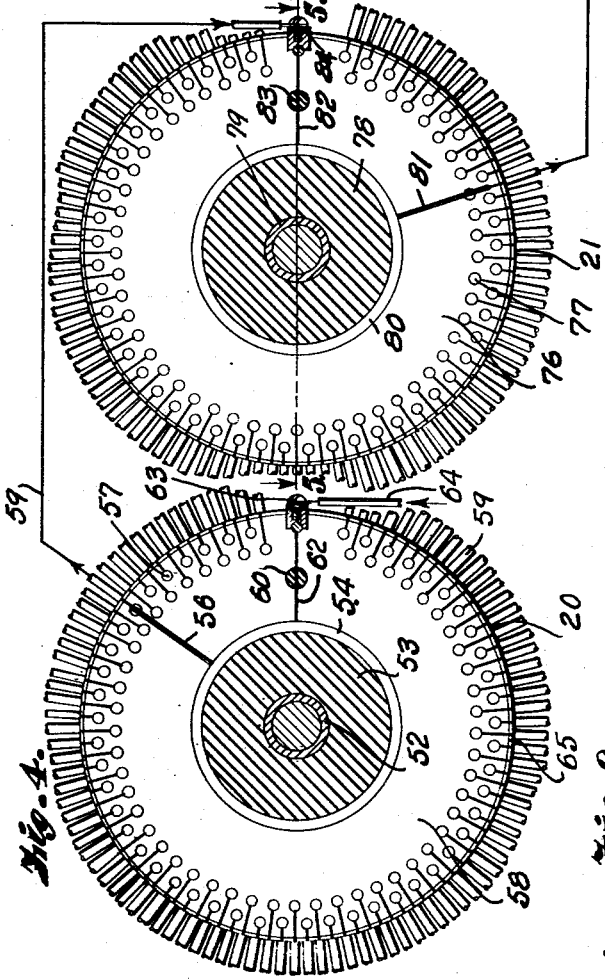
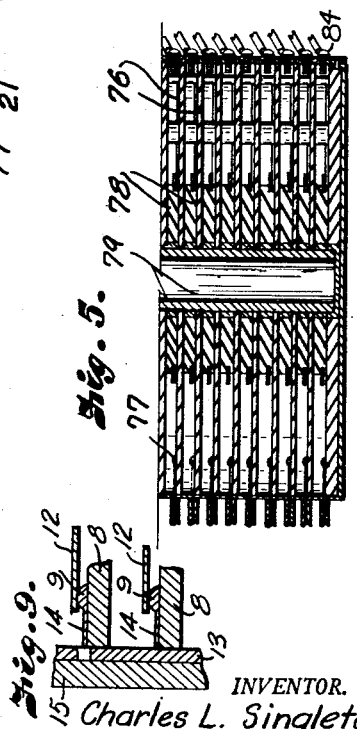
INVENTOR.
Charles L. Singleton.
BY
Fishburn & Mullendore
ATTORNEYS.

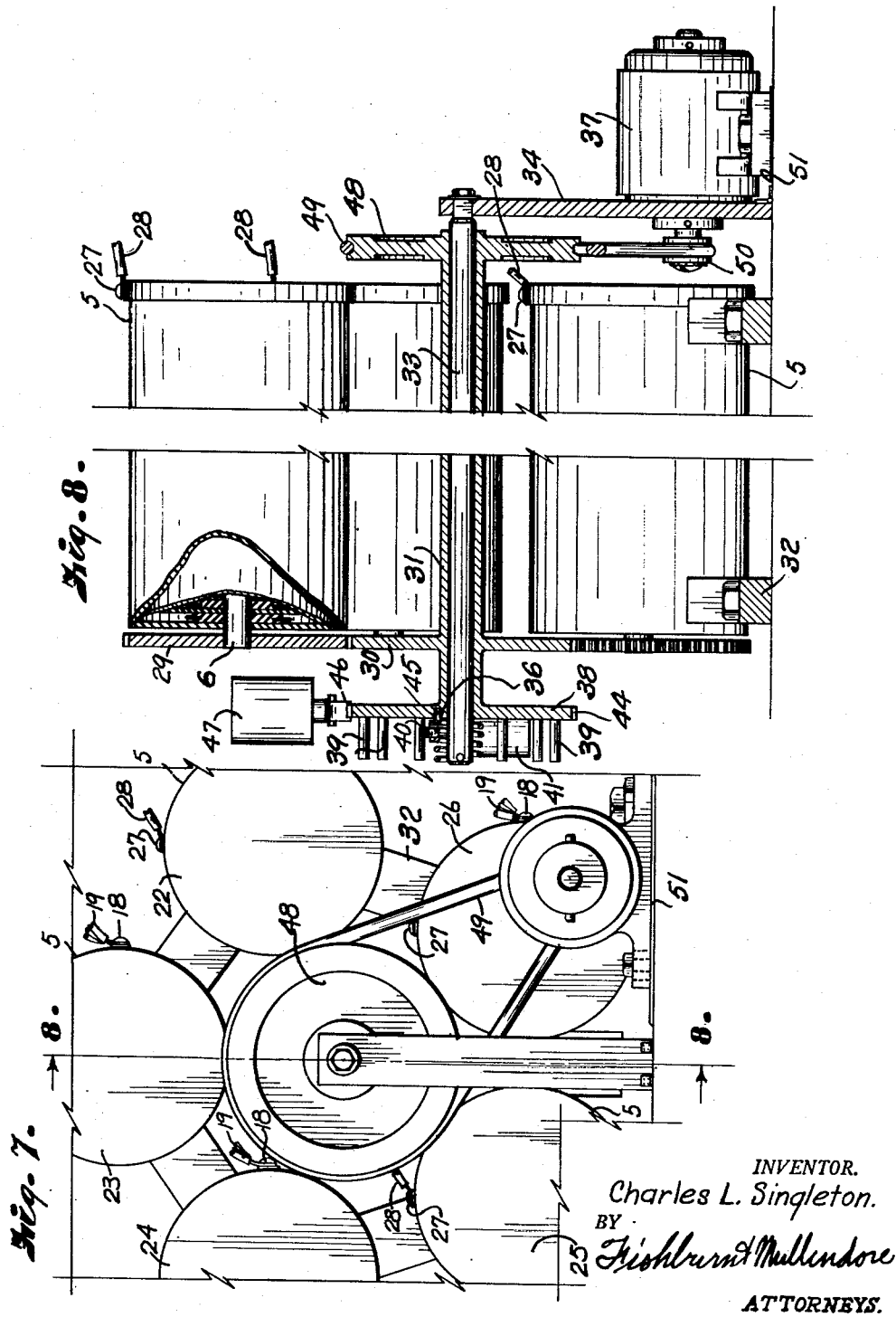

Patented Sept. 14, 1954

2,689,338

UNITED STATES PATENT OFFICE 2,689,338

ELECTRICAL CHECKING DEVICE

Charles L. Singleton, Kansas City, Mo., assignor of twelve and one-half per cent to Dan Silverstein, twenty-five per cent to Joseph S. Levy, thirty-seven and one-half per cent to Norman C. Weiss, and seventeen and one-half per cent to Warren W. Wormington, all of Kansas City, Mo.

Application February 13, 1952, Serial No. 271,314

10 Claims. (Cl. 340—152)

This invention relates to a checking apparatus for setting up and remotely indicating the condition of transactions that are designated especially by numbers. For example, customers' accounts in large department stores are identified by numbers for convenience of the clerks in checking accounts and for use of credit plates and cards which are issued to the customers. These credit cards or plates bear the customer's name and account number which the customer presents to the clerk whenever a purchase is made. The clerk, in making out the sales slip, uses the number which identifies the customer, but before the transaction is completed, the clerk must call the credit department of the store to determine whether or not the account remains active. This check takes up the clerk's and customer's time for the credit department to look up the account and report the condition of the account back to the clerk. Also, such check ups are at times embarrassing to the customer.

It is, therefore, an object of the present invention to provide an apparatus whereby the activity of an account represented by the numbers may be kept set up by the credit department, and the activity of the account is checked directly by the clerk so that no waiting is required on the part of the clerk or the customer.

Other objects of the invention are to provide a central apparatus of this character that is set up to indicate inactive accounts by fusing circuits representing the inactive account numbers; and to provide a plurality of remote stations with indicators adapted to be actuated to indicate the set up for any particular number.

Other objects are to provide an apparatus that is relatively simple in construction, positive in operation, and which is readily serviced to re-establish fused circuits when desired.

In accomplishing these and other objects of the invention hereinafter pointed out, I have provided improved structure, the preferred form of which is illustrated in the accompanying drawings wherein:

Fig. 2 is a diagrammatic perspective view of the switch and fuse units.

Fig. 3 is a perspective view, partially in section, of the number dialing and indicating apparatus.

Fig. 4 is a schematic view showing the switch banks in cross section.

Fig. 5 is a cross section through a portion of the second switch bank on the line 5—5 of Fig. 4.

Fig. 6 is a section through a portion of the fuse switch bank on the line 6—6 of Fig. 4.

Fig. 7 is a rear end of the fuse unit.

Fig. 8 is a longitudinal section through the fuse unit but with the upper fuse cylinder in elevation and a portion thereof broken away at the point of the section.

Fig. 9 is an enlarged fragmentary section of two of the fuse cylinders showing engagement therewith of one of the contacts of the contact disks.

Figure 1:
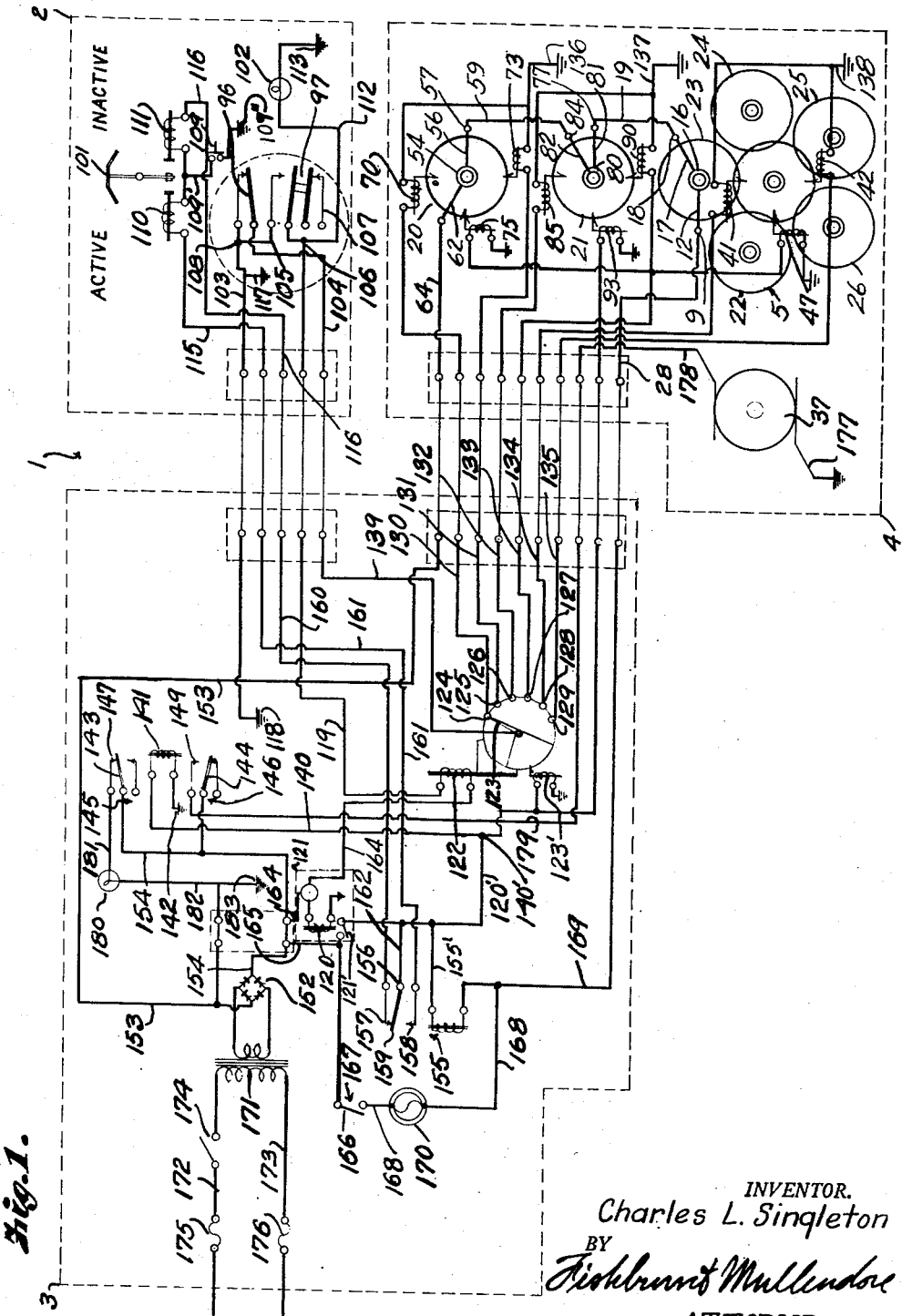
Fig. 1 is a diagrammatic view showing the parts of the apparatus and wiring connections therefor.

Referring more in detail to the drawings:

1 designates an apparatus constructed in accordance with the present invention and which includes one or more dialing and indicating units 2, a master control unit 3, and a circuit set up unit 4 whereby a number may be dialed to set up a circuit for connection with a fuse element and which effects activation of a signal at the dialing station to indicate an active or inactive account.

The fuse switch bank includes a plurality of assemblies 5 each having a shaft 6 carrying a plurality of insulating disks 7 that are fixed to the shaft 6 to rotate therewith. Interposed between the insulated disks 7 are stationary disks 8 carrying contacts 9. In the illustrated instance, the contacts 9 are arranged in an inner and outer circular series 10 and 11 with the contacts in the inner series staggered with respect to the contacts in the outer series and spaced apart so that a switch arm 12 for each disk 8 can engage only one contact at a time.

Extending about the periphery of the disks 8 is a cylinder 13 formed of fusible material, for example, a relatively thin metal foil which may be wrapped about the disks and securely retained in electrical engagement with leads 14 from the respective contacts 9 by means of an outer wrapper 15 of insulating material. The switch arms 12 extend radially from conductor rings 16 that are fixed to the peripheries of the insulating disks 7. Contacting each conductor ring is a brush 17 by which an electric current may be conducted from a related terminal 18. Each stationary contact disk 8 has one of the terminals 18 and the terminals are insulated with respect to each other and from the contacts 9 on the respective disks. Connected with the respective terminals 18 are conductors 19 in circuit with switch banks 20 and 21, later described.

There may be one or more of the fuse switch assemblies depending upon the size of the credit system with which the apparatus is to be used. For example, if the credit system involves 1,000,000 numbers, there may be 5 of the fuse switch units designated 22, 23, 24, 25, and 26, shown in Figs. 1 and 2. Each unit may be provided with 2,000 disks with 100 contacts on each disk giving a total of 1,000,000 contacts. The contact disks may be relatively thin and closely mounted on the rotating shafts and the units may be grouped about a common axis as shown in Figs. 1 and 2.

Each of the respective cylinders is provided with a terminal 27 for connecting conductors 28. It is obvious that if a fusing current is passed through conductors 19 and 28 and the contact arm 12 is engaged with a contact 9, the fuse cylinder will be fused at that contact point, that is the material of the cylinder 13 will melt at the point of connection of the contact with the cylinder and open up a hole with the result that an indicating current cannot be closed through the conductors 19 and 28 by way of that contact, because there is then no connection between that contact point and the cylinder. Therefore the circuit is open and a negative signal is given at the dialing station. If the connection for that particular contact with the fuse cylinder is intact the circuit through the cylinder is completed and, then the indicator at the dialing station will indicate an active credit account, as later described.

As above stated, the cylindrical fuse elements are arranged about a common axis and each shaft 6 is provided at one end with a driving gear 29 that meshes with a drive gear 30 common to all the gears 28. The drive gear 30 is fixed to a quill shaft 31 mounted in the axis about which the fuse elements are grouped as best shown in Fig. 8, the cylinders being supported by a frame 32. The quill shaft 31 is mounted on a fixed shaft 33 carried by a bracket 34 at one end as shown in Fig. 8.

The contact arms 12 are kept in zero position, that is, in stopped engagement with insulating rods 35 by a spring 36. The rods 35 extend through the stationary disks and may also be used to support the disks in their required relationship.

The quill shaft 31 is rotated in a forward direction by a motor 37 through a slip drive mechanism, later described, and by a ratchet wheel 38 that is mounted on the shaft 31 and which carries a plurality of pins 39 arranged on the gear 38 in a circular series and adapted to be successively engaged by a pawl 40 actuated by an electromagnet relay 41, there being ten pins 39 so that with each operation of the electro-relay 41, the contact arms are advanced ten contacts.

A second relay 42 is provided to actuate a pawl 43 that engages teeth 44 on the periphery of the gear wheel 38 to advance the wheel one tooth or one contact at a time. The pawls are arranged to effect rotation of the gear 38 in the direction of rotation by the motor 37 and to tension the coil spring 36 that is wrapped about the shaft 33 and has one end fixed to the shaft or rod 33 and the other end fixed to the gear wheel 38 as indicated at 45. The gear wheel 38 is retained from backward rotation under action of the tension spring 36 by means of a click 46 that also engages the teeth of the gear wheel 38 and which is adapted to be released by a relay magnet 47 when the switch arms of the fuse element assemblies are to be returned to their zero position, as later described.

The slip drive of the motor comprises a pulley 48 that is fixed to the quill shaft. Operating over the pulley 48 is a belt 49 that is driven by a pulley 50 on the shaft of the motor 37. The motor is adjustably mounted on slides 51 to tension the belt so that the belt will slip and in itself will not turn the shafts of the cylinder assemblies.

The switch banks 20 and 21 are of generally the same construction as the fuse element assemblies with the exception that the fuse cylinders 13 are omitted, their function being to make the contact representing a given account number.

The switch bank 20 includes a shaft 52 mounting a single insulating disk 53 carrying a conductor ring 54 having a radially projecting contact arm 56 adapted to engage contacts 57 that are carried on a fixed insulating disk 58 in the same manner as the contacts previously described. However, in this instance, each contact is connected by an individual conductor 59. The contact arm 56 is normally kept in zero position or against an insulating stop 60 which supports a brush 62 that makes contact with the conductor ring 54, the brush 62 being provided with a terminal 63 to which a conductor 64 is connected. The conductors may be carried by a cylindrical housing 65 that encircles the disk 58.

The shaft 52 is rotated to move the contact arm 56 from zero position by a ratchet wheel 66 against action of a return spring 67. The ratchet wheel 66 is provided with a circular series of pins 68 that are adapted to be successively engaged by a pawl 69 actuated by a relay 70 to effect advance of the contact arm 56 to engage every tenth contact.

To engage the intermediate contacts, the ratchet wheel is actuated by a pawl 71 engaging peripherial teeth 72 of the ratchet wheel so that the contact arm may be moved one contact at a time under operation of a relay 73, Fig. 2. The ratchet wheel 66 is stopped by a click 74 released by an electromagnet 75.

The switch bank 21 conforms to the construction of the switch bank 20. However, this switch bank includes one hundred stationary disks 76, each carrying a hundred contacts 77 arranged in accordance with the arrangement of the contacts on the other disk. Each contact is connected by a conductor 19 with a related disk in the fuse element assembly.

The switch bank 21 also has insulating disks 78 that are fixed to a quill shaft 79. Each insulated disk carries a conductor ring 80 having a contact arm 81. Each conductor ring 80 is provided with a brush contact 82 that is carried by an insulating rod 83 extending through all the respective contact disks. Connected with the respective brushes are individual terminals 84 for connection by a conductor 59 leading from a related contact of the switch bank 20.

The quill shaft 79 for the switch bank 21 is actuated to turn the contact arms in steps of ten by a relay 85 that operates a pawl 86 engaging pins 87 on the face of a ratchet wheel 88 in the same manner as the relays 41 and 70, previously described. The shaft is rotated by unit steps through a pawl 89 that is actuated by a relay 90 and which engages the teeth 91 of the ratchet wheel 88. The ratchet is under control of a click 92 that engages the teeth 91 of the ratchet and which is adapted to be released by a relay 93.

The dialing units which are located at the respective clerk stations may each comprise a base 95 carrying a single contact switch 96 and a double contact switch 97 that are adapted to be actuated upon manipulation of a finger operated disk 98 moving over a fixed dial 99 carrying the numerals 1 to 9 and zero in exactly the same relation as the ordinary telephone dial. The switches may be enclosed in a housing 100 which carries an oscillatory type of indicator 101 and a pilot light 102, later described. The switch 96 opens a control circuit through conductors 103 and 104. The switch 97 opens and closes circuit through conductors 105, 106, and 107. The conductor 105 makes connection with the conductor 103 as indicated at 108.

The indicator 101 is actuated by oppositely arranged electromagnets 110 and 111 which cause movement thereof from a neutral position to a position showing an active account when operated by the electromagnet 111 and an inactive account when the electromagnet 110 is energized upon closing of a switch 109 in a ground connection 109' as later described.

The pilot light 102 is connected with the conductor 106 through a conductor 112 and has a ground connection 113. The windings of the electromagnets 110 and 111 are also connected with conductors 115 and 116. The conductors 103, 104, 115, 116 and 106 are connected with the master control unit 3.

The conductor 103 is a ground conductor and is grounded to both the units 2 and 3 as indicated at 117 and 118. The conductor 106 connects with a conductor 119 in the unit 3 which leads from a time delay switch 121. Associated with the time delay switch 121 is an electromagnet 120 that actuates a switch 121' in a conductor 120'. The winding of stepper relay 122 is connected with the conductor 119 and operates a contact arm 123 which closes circuit through contacts 124, 125, 126, 127, 128 and 129 that are respectively connected by conductors 130, 131, 132, 133, 134 and 135 with the winding of the relays 70, 73, 85, 90, 41 and 42 respectively.

Circuits are completed through the windings of the respective relays 70, 73, 85, 90, 41 and 42 through ground connections 136, 137 and 138 (Fig. 1). The conductor 104 is connected with the contact arm 123 by a conductor 139. The conductor 120' connects with conductor 140 as shown at 140' which leads to the winding of a relay mechanism 141 having a ground connection 142.

The relay mechanism 141 operates the movable armatures 143 and 144 of the switches 145 and 146 having fixed contacts 147 and 149 respectively. The movable contact members of the switches 145 and 146 are connected to a common conductor 154 leading to one of the output terminals of a current rectifier 152. The other output terminal of the rectifier is connected by a conductor 153, with the conductor 64 supplying current to the first switch bank and through the contacts 57 to the contact arms 81 of the second switch bank through the conductors 59 depending upon which contact 57 that the arm 56 comes to rest, as later described.

The current is likewise supplied to the switch arm 12 by way of the conductor 19 depending upon the contact which is engaged by the arm 81, the current finally being completed through a fuse cylinder 13 at a point depending upon which of the contacts 9 are engaged by the arm 12. If the point of the fuse cylinder is intact, the current is completed through the conductor 28.

Connected with the conductor 120' is a conductor 155' with the winding of a relay 155 which actuates a switch 156 having fixed contacts 157 and 158 and a movable contact arm 159. The fixed contact 157 is connected with the conductor 116 by a conductor 160, and the fixed contact 158 is connected with the conductor 115 by a conductor 161. The movable contact arm 159 is connected with the conductor 120' by a conductor indicated at 162.

The time delay device 121 receives current from the conductor 154 through a conductor 164. Also connected with the conductor 154 is a conductor 165 leading to the movable contact arm 166 of a canceling switch 167, the fixed contact of which is connected by a conductor 168 with the conductor 169. A disk type circuit breaker 170 may be inserted in the conductor 168.

The current is supplied to the selenium rectifier through a transformer 171 having its primary winding connected with service conductors 172 and 173 that may be connected with any available current supply.

An "off" and "on" switch 174 may be inserted in one of the conductors, for example, the conductors 172. Both conductors may be provided with a fuse 175 and 176 to protect the circuits.

The motor 37 has a ground connection 177 to complete a circuit when current is supplied to the motor 37 through a conductor 178 that connects with a conductor 179 leading to the contact 149 of the switch 146.

The master control mechanism may be provided with a pilot light 180 that is connected in circuit with the contact 147 by a conductor 181, the circuit being completed through a conductor 182. A ground is established in the master control mechanism as indicated at 183, which ground is in connection with the conductor 182 to complete circuit by way of the grounds 113, 136, 137, 138 and 177.

Assuming that the apparatus is set up as described and that a clerk wishes to check account number 138279, the clerk will dial the number by manipulating the finger desk 98 to dial successively the numerals 1, 3, 8 and following.

When the numeral "1" is dialed, a circuit is closed by the switch 97 from the rectifier 152 by way of the conductors 154, 164, electromagnet 122, time delay device 121, electromagnet 122, conductor 119, switch 97, conductor 105 to ground 117. The flow of current in this circuit energizes the time delay device 121 and winding of the stepper relay 122 to effect movement of the contact arm 123 to the contct 124. Energization of the time delay device 121 also energizes the electromagnet 120 to close the switch 121' so that a current flows through a circuit including the conductors 154 and 165, switch 121', conductor 120' and relays 75, 93, 47, and 123' to retain the pawls in engagement with the respective ratchet wheels and prevent retractive rotation thereof.

Simultaneously, a current flows through the winding of the relay 141 by way of the conductors 154, 165, switch 121', conductor 120', conductor 149 and ground 142 so as to open circuit to the signal 180 by breaking the contact 147 in the circuit which includes the conductors 154 and 182. Circuit is also closed through the switch 146 to the motor 37 by way of conductor 154, switch arm 144, contact 149, conductor 179, conductor 178 and ground 177. On the return movement of the dial, the dial opens and closes the switch 96 so as to effect a single impulse through the electromagnet 70 and effect advancement of the first stage switch one pin or ten contacts. This is effected by the current flowing from the rectifier through conductors 154, 164, 119, 106, 105, 104, 139, contact arm 123, conductor 130, winding of the electromagnet 70 and conductor 136 to ground. When the dial returns to rest position, the switch 97 is opened so that circuit is opened through the winding of the stepper relay 122.

The second numeral of the number, "3," is now dialed. During this dialing, the time delay device is still activated so that the electromagnets controlling the pawls retain the pawls in position for preventing retractive rotation of the respective ratchet wheels. When the switch arm 97 makes contact, the winding of the electromagnet 122 is again energized so that the contact arm 123 is advanced to the second contact 125. A current is then established through the conductor 131 to energize the electromagnet 73 and effect actuation of the pawl 71 to advance the ratchet wheel 66 three teeth.

The numeral "3" is then dialed to again cause energization of the electromagnet 122 to advance the contact arm 123 to the contact 126. On return movement of the dial, circuit is made and broken eight times by the switch arm 96 which causes eight impulses to pass through the conductor 132 and winding of the electromagnet 85 of the second stage switch to cause the pawl 86 to advance the ratchet wheel 88 eight pins.

On dialing the numeral "2," the electromagnet 122 is again energized to advance the switch arm to the contact arm 127 whereupon the current passes through the conductors 133 and winding of the electromagnet 90 to cause the pawl 89 to advance the ratchet wheel of the second stage switch two teeth.

On dialing the numeral "7," the electromagnet 122 is again energized. This advances the switch arm 123 to the contact 128 and on return movement of the dial, seven impulses are caused to occur in the circuit including the conductor 134 and winding of the electromagnet 41 to advance the ratchet wheel 38 seven pins.

When the numeral "9" is dialed, the switch 123 is caused to engage the contact 129 so that on return movement of the dial, nine impulses are effected through the conductor 135 and winding of the electromagnet 43 to advance the ratchet wheel for the fuse bank nine teeth.

The stage switches are now set up so that a current flows from the rectifier through the conductors 154, 165, switch 121', conductors 120' and 155', winding of the relay 155, conductor 169 and conductor 28 through the fuse cylinder which is then in circuit for example the cylinder 23, providing that the fuse cylinder is intact at the point making connection with the contact 9 that is then in circuit as set up by the dialing operations.

The current is completed through the contact arm 12, which is in engagement with the selected contact 9, collector ring 16, brush 17, connection 18 and conductor 19 to the contact 77 of the second stage switch 21 which is in engagement with the contact arm 81. The current continues through the collector ring 80 and brush 82 through the connection 84, conductor 59, the contact 57 that is in connection therewith, the switch arm 56, collector ring 54, brush 62 and conductor 64, conductor 153 back to the rectifier 152.

The clerk then closes the manual switch 109 so that the indicating device 101 is in circuit. If the fuse element has been fused and the circuit open, no current flows through the electromagnet 155. Therefore, when the switch 109 is closed the switch arm 159 retains its engagement with the contact 157 and a signal current flows from the rectifier through the conductors 154, 165, switch 121', conductor 120', conductor 162, switch arm 159, switch contact 157, conductor 160, conductor 116, and winding of the electromagnet 111 to cause actuation of the indicator 101 to indicate that the account is inactive, the circuit being completed through the conductor 109' to the ground 109".

If the point of contact of the fuse element has not been fused, the circuit therethrough is completed so that current flows through the winding of the electromagnet 155. Therefore, when the clerk closes the switch 109, current passes through the conductor 154, 165, switch 121', conductor 120', conductor 162, switch arm 159, contact 158, conductor 161, conductor 115, winding of the electromagnet 110, conductor 109', switch 109 to ground. This flow of current energizes the electromagnet 110 to move the indicator 101 so as to show that the account is active.

The clerk has a given time to dial an account number and obtain the desired information. After this interval has expired, the time delay device 121 opens the circuit to the relay 120 so that the switch 121' thereof opens and opens circuit to all of the electromagnets controlling the clicks of the respective ratchet wheels, whereupon the coil springs 67 are active in returning the various switch arms 123, 156, 81 and 12 to their neutral positions. Opening of the switch 121' also breaks the circuit through the relay 141, and the switch arm 144 opens to break the current to the electric motor 37 which assists the electromagnets of the fuse switch unit to move the quill shafts of the respective units thereof.

Inactive account numbers are set up as follows:

When an account is determined to be inactive, the number is set up as when the number for that account is dialed. After the number has been dialed, the switch 166 is closed manually so that a fusing current passes from the rectifier through the conductor 154, 165, switch 167, conductor 168, circuit breaker 170, conductor 168, conductor 169, conductor 28, fuse cylinder, contact 9, the switch arm 12 that is engaged with the contact 9, collector ring 16, brush 17, conductor 19, contact 77, switch arm 81 engaged with that contact, collector ring 80, brush 82, conductor 59, contact 57, switch arm 56, collector ring 54, brush 62, conductor 64, and conductor 153 to the opposite terminal of the rectifier.

Since this circuit does not include any of the electromagnets and particularly the winding of the relay 155, it is sufficient to effect fusing of the fuse element at the point conforming with the number of the account that has been declared inactive. It is thus obvious that the fuse switch unit is set up to show inactive accounts when the numbers for those accounts have been set up and a fusing current has been passed through the corresponding points of the fuse elements.

From the foregoing, it is obvious that I have provided a checking apparatus for setting up and remotely indicating the condition of accounts so that a clerk or other person desiring to check the activity of an account may quickly, by a dialing operation, determine the condition of an account at his station without waiting to obtain clearance of a sale through the accounting department.

While I have particularly described the invention as adapted to account systems, it is obvious that it may be used for checking other services or transactions where the respective service or transaction is identified by a number.

What I claim and desire to secure by Letters Patent is:

1. In a checking apparatus of the character described, a fuse element, a plurality of contacts in connection with the fuse element, a movable contact adapted to be selectively engaged with any one of said contacts, a circuit including the movable contact and said fuse element, means for supplying an electric current to said circuit means for remotely actuating the movable contact, a signal connected with said circuit and actuated responsive to the presence or absence of a current flowing through the fuse element, and means connected with said circuit for passing a fusing current through the fuse element.

2. In a checking apparatus of the character described, a plurality of fixed contacts, a fuse element contacting all of the fixed contacts, a movable contact adapted to be engaged with any one of said contacts, an electrical circuit including the fuse element and said movable contact, signal means having connection with said circuit, means for moving the movable contact to a selected fixed contact for effecting operation of the signal means to indicate condition of the fuse element at the point engaging said selected fixed contact, a current supply for the circuit and means connected with said circuit for passing a fusing current through the fusing element at the contact point of any fixed contact when that fixed contact is engaged by said movable contact.

3. In a checking apparatus of the character described, a plurality of fixed contacts, a fuse element contacting all of the fixed contacts, a movable contact adapted to be engaged with any one of said contacts, an electrical circuit including the fuse element and said movable contact, signal means having connection with said circuit, means remote from the movable contact for actuating the movable contact to effect operation of the signal, said signal being located at the place of the actuating means, a current supply for said circuit and means for passing a fusing current through the fuse element at any contact point when the contact for that point is engaged by the movable contact.

4. In an apparatus of the character described, a fuse unit including, a plurality of insulating disks each having a plurality of individual contacts, a fuse element extending about the disks and engaging said contacts, a supporting shaft coaxially of the disks, a quill shaft rotatable on the supporting shaft, a plurality of contacts carried by the disks, contact arms carried on the quill shaft for engaging the contacts of the respective disks, a ratchet wheel on the quill shaft having peripheral teeth and pawl engaging means arranged in circular series on one face of the ratchet wheel, an electromagnet having a pawl engaging the teeth of the ratchet wheel to rotate the quill shaft to advance said contact arms from one contact to the next, an electromagnet having a pawl engaging the pins of the ratchet wheel to rotate the quill shaft to advance the contact arms over ten contacts, a click engageable with the teeth of the ratchet wheel to prevent retractive movement of the quill shaft, an electromagnet for releasing the click, and means for rotating the quill shaft in reverse direction upon release of the click.

5. In an apparatus of the character described, a fuse unit including, a plurality of insulating disks each having a plurality of individual contacts, a fuse element extending about the disks and engaging said contacts, a supporting shaft coaxially of the disks, a quill shaft rotatable on the supporting shaft, a plurality of contacts carried by the disks, contact arms carried on the quill shaft for engaging the contacts of the respective disks, a ratchet wheel on the quill shaft having peripheral teeth and pawl engaging means arranged in circular series on one face of the ratchet wheel, an electromagnet having a pawl engaging the teeth of the ratchet wheel to rotate the quill shaft to advance said contact arms from one contact to the next, an electromagnet having a pawl engaging the pins of the ratchet wheel to rotate the quill shaft to advance the contact arms over ten contacts, a click engageable with teeth of the ratchet wheel to prevent retractive movement of the quill shaft, an electromagnet for releasing the click, means for rotating the quill shaft in reverse direction upon release of the click, a motor, and a slip driving connection between the motor and the quill shaft to assist the electromagnets in rotating the quill shaft.

6. In an apparatus of the character described, a fuse unit including, a plurality of insulating disks each having a plurality of individual contacts, a fuse element extending about the disks and engaging said contacts, a switch bank including a disk having a plurality of contacts, shafts having rotational support coaxially of the disks of the switch bank and said fuse unit, arms on the shafts corresponding to the number of disks associated with said shafts and movable over the contacts of the respective disks, current carrying means connecting the contacts of the switch bank with the contact arms of the fuse unit, means for rotating the shafts to advance said contact arms a contact at a time, and separate means for advancing the shafts to advance the contacts a multiple of said contacts at a time.

7. In an apparatus of the character described, a fuse unit including, a plurality of insulating disks each having a plurality of individual contacts, a fuse element extending about the disks and engaging said contacts, a switch bank including a disk having a plurality of contacts, shafts having rotational support coaxially of the disks of the switch bank and said fuse unit, arms on the shafts corresponding to the number of disks associated with said shafts and movable over the contacts of the respective disks, current carrying means connecting the contacts of the switch bank with the contact arms of the fuse unit, means for rotating the shafts to advance said contact arms a contact at a time, separate means for advancing the shafts to advance the contacts a multiple of said contacts at a time, and means remote from the fuse unit to energize said advancing means.

8. In an apparatus of the character described, a fuse unit including a plurality of insulating disks each having a plurality of individual contacts, a fuse element extending about the disks and engaging said contacts, a switch bank including a disk having a plurality of contacts, shafts having rotational support coaxially of the disks of the switch bank and said fuse unit, arms on the shafts corresponding to the number of disks associated with said shafts and movable over the contacts of the respective disks, current carrying means connecting the contacts of the switch bank with the contact arms of the fuse unit, means for rotating the shafts to advance said contact arms a contact at a time, separate means for advancing the shafts to advance the contacts a multiple of said contacts at a time, and means remote from the fuse unit to energize said advancing means, said last named means including a dialing mechanism and circuits connecting the dialing mechanism with said advancing means.

9. In an apparatus of the character described, a fuse unit including, a plurality of insulating disks each having a plurality of individual contacts, a fuse element extending about the disks and engaging said contacts, a switch bank including a disk having a plurality of contacts, shafts having rotational support coaxially of the disks of the switch bank and said fuse unit, arms on the shafts corresponding to the number of disks associated with said shafts and movable over the contacts of the respective disk, current carrying means connecting the contacts of the switch bank with the contact arms of the fuse unit, means for rotating the shafts to advance said contact arms a contact at a time, separate means for advancing the shafts to advance the contacts a multiple of said contacts at a time, means remote from the fuse unit to energize said advancing means, said last named means including a dialing mechanism and circuits connecting the dialing mechanism with said advancing means, a signal circuit associated with the dialing circuits and having connection with the fuse element, and signal means in the signal circuit.

10. In an apparatus of the character described, a fuse unit including, a plurality of insulating disks each having a plurality of individual contacts, a fuse element extending about the disks and engaging said contacts, a shaft coaxially of the disks, a second stage switch bank having a plurality of contacts carried by the disks, a first stage switch bank including a disk having a plurality of contacts, shafts having rotational support coaxially of the disks of the switch banks and said fuse unit, arms on the shafts corresponding to the number of disks associated with said shafts and movable over the contacts of the respective disks, electric conductors connecting the contacts of the first stage bank with the contact arms of the second stage bank, conductors connecting the contacts of the second stage bank with the contact arms of the fuse unit, ratchet wheels on the shafts having peripheral teeth and pins arranged in circular series on the faces of the respective ratchet wheels, electromagnets having pawls engaging the teeth of the ratchet wheels, electromagnets having pawls for engaging the pins of the ratchet wheels, a selector switch having contacts corresponding with the electromagnets, said selector switch having a movable contact arm, electrical conductors connecting the contacts with their corresponding electromagnets, means for effecting movement of the last named contact arm in progressive movement over the contacts of the selector switch, means for remotely actuating said means including means for effecting current pulsations through the electromagnets in circuit with the contact arm of the selector switch, indicating means including an electric circuit for actuating the indicating means, and means responsive to presence and absence of current flow through the fuse unit for indicating condition of the fuse element at the point of contact with a contact in circuit with the current supply as set up by the current impulses produced in the electromagnets.

References Cited in the file of this patent

UNITED STATES PATENTS

| Number | Name | Date |
|---|---|---|
| 916,280 | Donitz | Mar. 23, 1909 |
| 1,496,101 | Schmitt | June 3, 1924 |
| 1,498,544 | Fowler | June 24, 1924 |
| 2,446,643 | Farmer | Aug. 10, 1948 |